(12) United States Patent
Angwin et al.

(10) Patent No.: US 6,662,224 B1
(45) Date of Patent: Dec. 9, 2003

(54) METHODS, SYSTEMS AND COMPUTER PROGRAM PRODUCTS FOR PROVIDING ALTERNATIVE DISPLAYS FOR NETWORKED DEVICES

(75) Inventors: Alastair J. Angwin, Eastleigh (GB); David George Bevis, Eastleigh (GB); Stefan Georg Hild, Zurich (CH); Sandeep Kishan Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,947

(22) Filed: Sep. 24, 1999

(51) Int. Cl.[7] ............................................. G06F 15/173
(52) U.S. Cl. ........................ 709/224; 709/217; 709/219; 709/225; 345/2.2
(58) Field of Search ................................. 709/228, 237, 709/246, 205, 230, 206, 207, 245, 248, 227, 200–203, 217–219, 229, 225, 224, 329; 345/333, 751, 2.2, 804, 866; 700/83

(56) References Cited

U.S. PATENT DOCUMENTS

| | | | |
|---|---|---|---|
| 4,818,048 A | 4/1989 | Moss | 350/3.7 |
| 5,509,048 A | 4/1996 | Meidan et al. | 379/58 |
| 5,566,224 A | 10/1996 | ul Azam et al. | 379/58 |
| 5,634,018 A * | 5/1997 | Tamikosshi et al. | 345/751 |
| 5,831,664 A * | 11/1998 | Wharton et al. | 725/81 |
| 5,895,471 A | 4/1999 | King et al. | 707/104 |
| 6,006,274 A * | 12/1999 | Hawkins et al. | 709/248 |
| 6,101,528 A * | 8/2000 | Butt | 709/203 |
| 6,216,158 B1 * | 4/2001 | Luo | 709/217 |
| 6,282,574 B1 * | 8/2001 | Voit | 709/230 |
| 6,295,551 B1 * | 9/2001 | Roberts et al. | 709/205 |
| 6,300,947 B1 * | 10/2001 | Kanevsky | 345/333 |
| 6,330,618 B1 * | 12/2001 | Hawkins et al. | 709/248 |
| 6,507,762 B1 * | 1/2003 | Amro et al. | 700/83 |
| 6,604,127 B2 * | 8/2003 | Murphy et al. | 709/217 |

* cited by examiner

Primary Examiner—Wellington Chin
Assistant Examiner—Chuong Ho
(74) Attorney, Agent, or Firm—Myers Bigel Sibley & Sajovec, P.A.; Gerald R. Woods (57) ABSTRACT

Methods, systems and computer program products are provided for accessing an alternative display from a data processing system by automatically discovering the accessibility of a display server operably associated with a network upon connection of the data processing system with the network. Display information corresponding to display content to be rendered by a display of the data processing system is generated and provided to the display server over the network so as to allow the corresponding display content to be rendered by the display server on a display associated with the display server.

33 Claims, 5 Drawing Sheets

METHODS, SYSTEMS AND COMPUTER PROGRAM PRODUCTS FOR PROVIDING ALTERNATIVE DISPLAYS FOR NETWORKED DEVICES

FIELD OF THE INVENTION

The present invention relates to networked devices in general and in particular to the displays associated with networked devices.

BACKGROUND OF THE INVENTION

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Computing devices including, but not limited to, PDAs, cellular telephones, and computing devices utilized within appliances and automobiles are often collectively referred to as "pervasive" computing devices. Many hand-held computing devices utilize the Microsoft® Windows CE, 3Com Palm Computing®, and Symbion Epoc platforms as well as web browsers such as HandWeb from SmartCode, Inc. and the Pocket Internet Explorer from Microsoft, Inc. As used herein, the term "pervasive computing device" refers to a data processing system which may connect to different networks and is intended to include PDAs, laptop and portable computers, pen-based portable computers, wireless telephones, smart phones, screenphones, copiers and other office equipment, appliances, factory controllers, etc.

Unfortunately, as the size of pervasive computing devices has decreased, typically, the size of the display of the device has also decreased. Such a decrease in size may limit usability in certain situations and may even be dangerous. For example, in utilizing a smartphone in a vehicle such as an automobile, the display provided by the smartphone may be difficult to read or utilize effectively while operating the vehicle. Programmed function keys, pager contents or even web page contents which may be suitably displayed when the smartphone is handheld may be too small to see at a distance or too difficult to read without distraction from a vehicle operator's main task, operating the vehicle.

Attempts at providing alternative displays which are more easily read by, for example, the operator of a vehicle, may be seen, in U.S. Pat. Nos. 4,818,048, 5,509,048 and 5,566,224. However, each of these displays utilized dedicated hardware which was tailored to the specific device being displayed. Any device utilizing these displays would typically need to be specifically interfaced to the display. Thus, these displays may be of limited use if an ability to provide alternative displays for different types of devices is desired. For example, it may be desirable to provide a generic ability to provide an alternative display which may be utilized with different devices such as a smartphone or a PDA. The above described systems are each dedicated systems for a particular device and, thus, may not provide the ability to utilize the alternative display with different devices.

In light of the above discussion, a need exists for a mechanism to provide alternative displays for pervasive computing devices.

SUMMARY OF THE INVENTION

Accordingly, it is an object of the present invention to provide methods, systems and computer program products which can provide an alternative display for pervasive computing devices.

A further object of the present invention is to provide an alternative display which may be automatically detected and utilized by a pervasive computing device.

It is a further object of the present invention to provide such methods, systems and computer program products which can automatically accommodate various types of hardware operating under different operating systems.

A still further object of the present invention is to provide methods, systems and computer program products which enhance the usability of pervasive computing devices.

These and other objects may be provided, according to the present invention, by methods, systems and computer program products for accessing an alternative display from a data processing system by automatically discovering the accessibility of a display server operably associated with a network upon connection of the data processing system with the network. Display information corresponding to display content to be rendered by a display of the data processing system is generated and provided to the display server over the network so as to allow the corresponding display content to be rendered by the display server on a display associated with the display server.

By automatically discovering a display server and then providing the display content to the display server, the present invention may provide an alternative display for pervasive computing devices. Furthermore, by utilizing a display server capable of being discovered by a networked device, an alternative display may be automatically detected and utilized. Also, because a display server renders the display content for the data processing system, various types of hardware operating under different operating systems may be readily accommodated. Through the automatic discovery and utilization of an alternative display, a more user friendly display may be provided without requiring extensive user setup or knowledge of the network environment.

In a particular embodiment of the present invention, the accessibility of a display server may be automatically discovered by detecting connection of the data processing system with the network and then transmitting a service discovery request. A response to the service discovery request is received and the received response evaluated to discover the accessibility of the display server.

The generated information to be rendered by the display server may be information received by the data processing system, information created by the data processing system or a combination of information received and information created by the data processing system. In the case where the information is received by the data processing system, the display content may be provided to the display server by forwarding the received information to the display server. In any case, display content may be provided to the display server by posting the generated display information to the display server so as to render the data processing system display content on a display associated with the display server. Such a posting of display content may be accomplished by transmitting a Hypertext Transport Protocol (HTTP) POST message or a Wireless Session Protocol (WSP) POST message to the display server.

Preferably, the generated display information is provided as a markup language page. In particular, Hypertext Markup Language (HTML), Wireless Markup Language (WML), Voice Extensible Markup Language (VoiceXML) or Extensible Markup Language (XML) may be suitable however, any language for logically representing the display contents may be suitable.

In particular embodiments of the present invention the data processing system may be a pervasive computing device. Also, the network may be a network incorporated into vehicle a vehicle such as an automobile.

While the invention has been described above primarily with respect to the method aspects of the invention, both systems and/or computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below in part with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1:
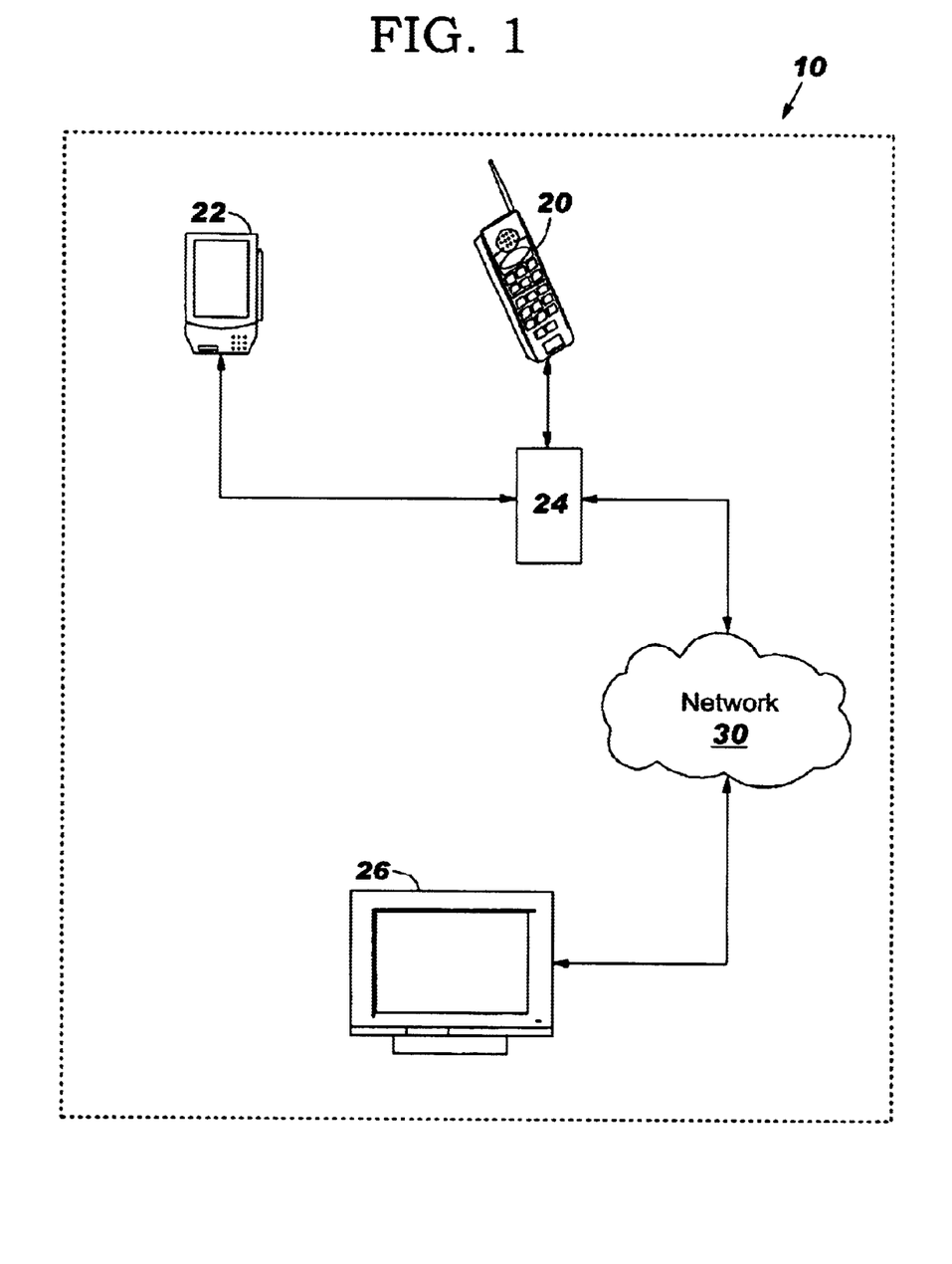
FIG. 1 is a schematic diagram of a network incorporating the present invention.

As is described in more detail below, and as illustrated in FIG. 1, the present invention provides a networked alternate display system 10 which may, for example, be incorporated into a vehicle. As illustrated in FIG. 1, a data processing system such as a wireless phone 20 or a PDA 22 or other such pervasive computing device may connect to a network 30 through, for example, a docking station 24, cradle or other mechanism for connecting to network 30 including plugging a cable into the data processing system.

However the data processing system 20, 22 connects to network 30, upon detecting that the data processing system 20, 22 is connected to network 30, which may, for example, be accomplished by detecting closure of an electrical circuit on the connector, the data processing system 20, 22 discovers the display server 26. The data processing system 20, 22 then utilizes the display server 26 to either replicate or replace the display of the data processing system 20, 22. As utilized herein, the term "display server" refers to a data processing system capable of receiving display content over a network and rendering that display content. While the present invention will be described with respect to the display being a visual display, the present invention may also be utilized with other forms of display, for example, an audio display. In such a case, the display server would receive the display content from the network and render the display content as audible sounds.

Furthermore, while FIG. 1 illustrates a single display server attached to network 30, as will be appreciated by those of skill in the art, other devices may be connection to network 30 as well as multiple devices simultaneously connected to network 30. Thus, network 30 may be utilized for purposes other than connection to a display server. Additionally, multiple display servers may be connected to network 30.

The present invention may utilize a broadcast request from data processing systems such as pervasive computing devices to a network having access to a display server. A response may then be provided by the display server or other server which either identifies itself as the display server or provides a pointer to the location of the display server (e.g. a Universal Resource Locator (URL)). The present invention may also utilize existing protocols for discovering devices such as the Universal Plug and Play (UPnP) protocol of Microsoft Corporation, the Jini protocol of Sun Microsystems, Incorporated the Service Location Protocol from Internet Engineering Task Force (IETF) or the Salutation Protocol from the Salutation Consortium. In any case, the data processing systems 20, 22 may discover the existence of the display server 26 without a priori knowledge of the configuration of servers or other devices associated with the network 30.

Furthermore, the information provided to the display server 26 for rendering may be a replication of the display content for the data processing system 20, 22 or information about the characteristics of the display server 26 may be provided to the data processing system 20, 22 and the content for display tailored for the type of display associated with the display server 26. Preferably, the display content provided to the display server 26 by the data processing systems 20, 22 is provided as a markup language page, such as a Hypertext Markup Language (HTML) page, a Wireless Markup Language (WML) page, a VoiceXML page or an Extensible Markup Language (XML) page. Thus, the display server 26 would receive the page from the data processing system 20, 22 and render the received page based on the markup language content of the page. Accordingly, the display server 26 could tailor the received content for its associated display type and, thereby, provide an improved display without requiring resources of the data processing system 20, 22.

The display content to be rendered may be generated by the data processing system 20, 22, by being created by the data processing system 20, 22, being received by the data processing system, or by a combination of receiving and creating display content.

As will be appreciated by those of skill in the art, the network 30 may take many different forms, including, for example, Ethernet, token ring, or a proprietary network architecture. Accordingly, the present invention should not be construed as limited to a particular type of network but may be utilized over any network which allows communication between the data processing system and the display server. Preferably, though, the network is capable of supporting Hypertext Transport Protocol (HTTP) or Wireless Session Protocol (WSP).

Furthermore, the present invention may be utilized with many different data processing systems, including data processing systems which do not incorporate a display themselves. For example, the present invention may be utilized with laptop computers, PDAs, pen based computers, cellular telephones, smartphones, screenphones or satellite telephones. However, as will be appreciated by those of skill in the art, other types of processing systems may also benefit from utilization of the present invention.

Figure 2:
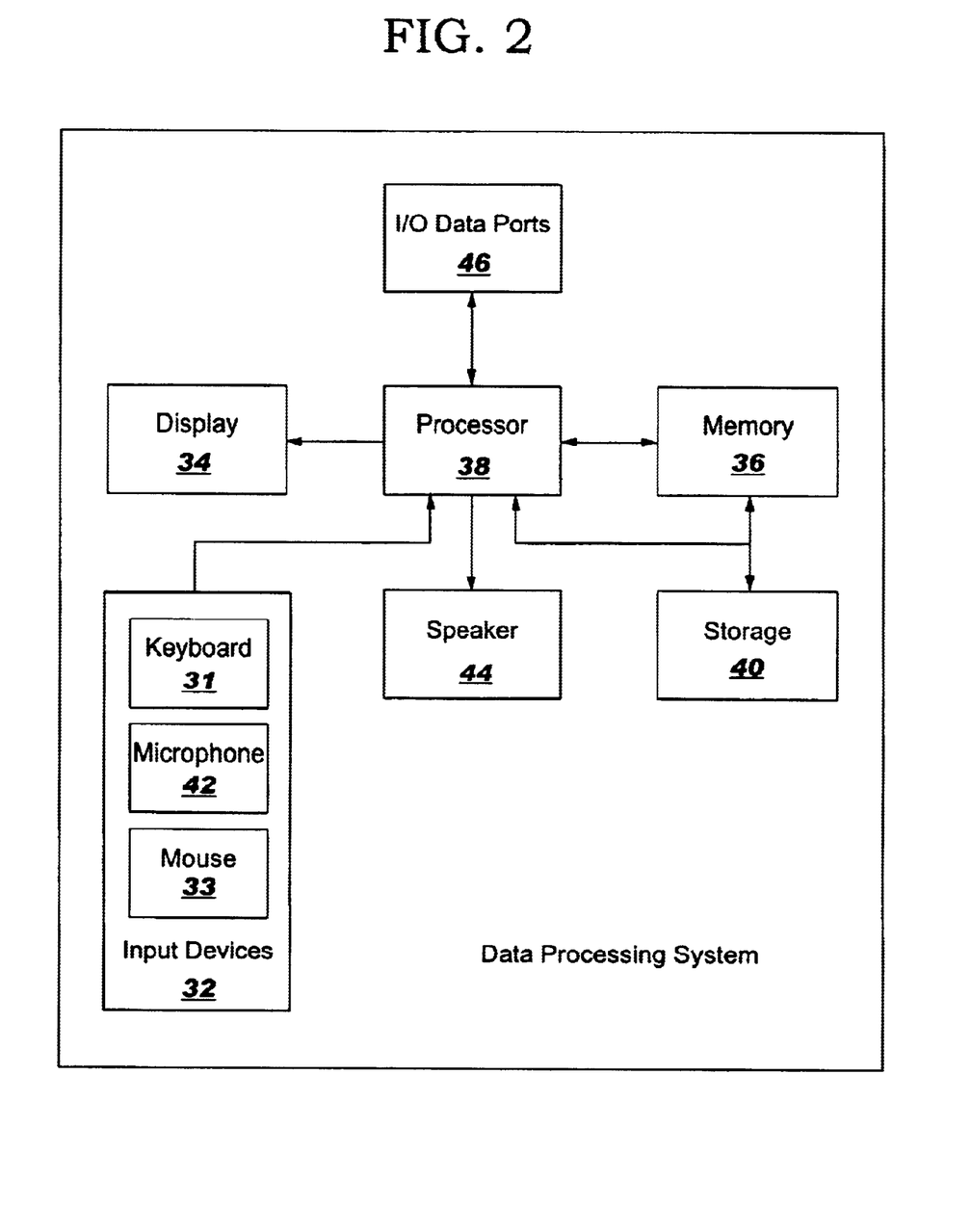
FIG. 2 is a block diagram of a data processing system suitable for use with the present invention.

Referring now to FIG. 2, an exemplary embodiment of a data processing system 20, 22 or a display server 26 which may be utilized with the present invention is illustrated. Typically, the data processing system 20, 22 and the display server 26 includes input devices 32, such as a keyboard or keypad 31, a microphone 42 and/or a mouse 33 or other pointing device. However, as will be appreciated by those of skill in the art, these input devices are merely examples and other input devices or combinations of input devices may be utilized. The data processing system 20, 22 or display server 26 also preferably includes a display 34 and a memory 36 that communicate with a processor 38. The data processing system 20, 22 or display server 26 may further include a speaker 44 and an I/O data port(s) 46 that also communicate with the processor 38. The I/O data ports 46 can be used to transfer information between the data processing system 20, 22 or display server 26 and another computer system or a network (e.g., the Internet or the network 30 of FIG. 1). FIG. 2 also illustrates that the data processing system 20, 22 or the display server 26 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the data processing system illustrated in FIG. 2, as will be appreciated by those of skill in the art, the present invention may be incorporated into many other devices where automatic access to alternative displays may be desired and, thus, may comprise an embedded function in many other devices. Thus, the present invention should not be construed as limited to use in systems such as illustrated in FIG. 2 but may be incorporated in any device having sufficient processing capabilities to carry out the operations described below.

Furthermore, as will be appreciated by those of skill in the art, various combinations of the components illustrated in FIG. 2 may be utilized to provide the functions of the data processing systems 20, 22 and/or the display server 26. Thus, for example, the display server 26 need not have input devices or a speaker if the alternative display is to be visual only. In such a case, the alternative display of the display server 26 may be display 34. Furthermore, additional capabilities may be provided such as, for example, a wireless transceiver may be provided if the data processing system is incorporated into a wireless telephone. Thus, while the present invention is described with respect to the processing system in FIG. 2, the present invention should not be construed as limited to the configuration illustrated in FIG. 2. The processing system of FIG. 2 is, therefore, merely provided as an example of a suitable processing system for use with the present invention.

Figure 3:
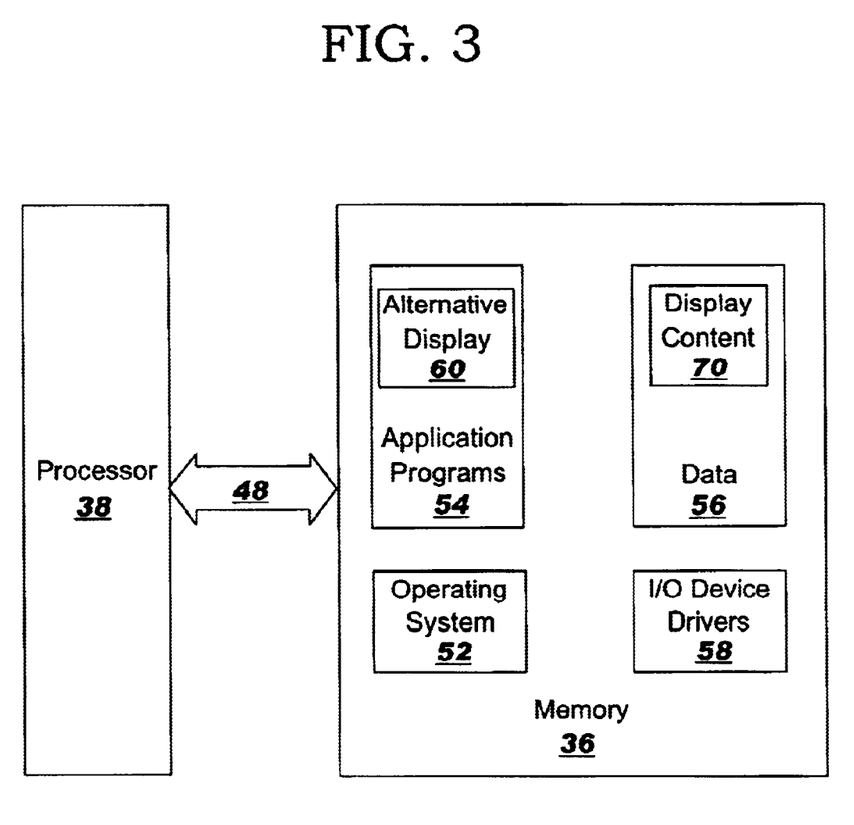
FIG. 3 is a more detailed block diagram of a data processing system incorporating aspects of the present invention which allow utilization of the alternative display according to one embodiment of the present invention.

FIG. 3 is a more detailed block diagram of the data processing system 20, 22 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the data processing system 20, 22 or the display server 26. The memory 36 can include, but is not limited to, the following types of devices: cache, ROM, PROM, EPROM, EEPROM, flash, SRAM, and DRAM.

As shown in FIG. 3, the memory 36 may hold four major categories of software and data used in the data processing system 20, 22: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the data processing system 20, 22 and preferably include at least one application module or object for discovering and utilizing an alternative display such as alternative display program or object 60 which carries out the operations of the present invention as described below.

Finally, the data 56 represents the static and dynamic data used by the application programs 54, operating system 52, I/O device drivers 58, and any other software program that may reside in the memory 36. As illustrated in FIG. 3, the data 56 preferably includes display content 70 to be displayed on the alternative display. Additional intermediate data (not shown) may also be stored in memory. Furthermore, while the present invention is described as an application executing on data processing system 20, 22, as will be appreciated by those of skill in the art, the present invention may be implemented in any number of manners, including incorporation in the operating system 52 or in an I/O device driver 58.

The display server 26 may be implemented in a manner similar to that illustrated in FIG. 3 for the data processing systems 20, 22. However, rather than the alternative display program or object 60 illustrated in FIG. 3, the display server 26 would have a display server application or object which when executed or instantiated would be capable or receiving display content from the network 30 and rendering the display content for a user on an alternative display such as display 34. As described in more detail below, the display server 26 is preferably a server which supports HTTP POST or WSP POST such that pages posted to the server are rendered by the server on the alternative display device such as display 34.

Figure 4:
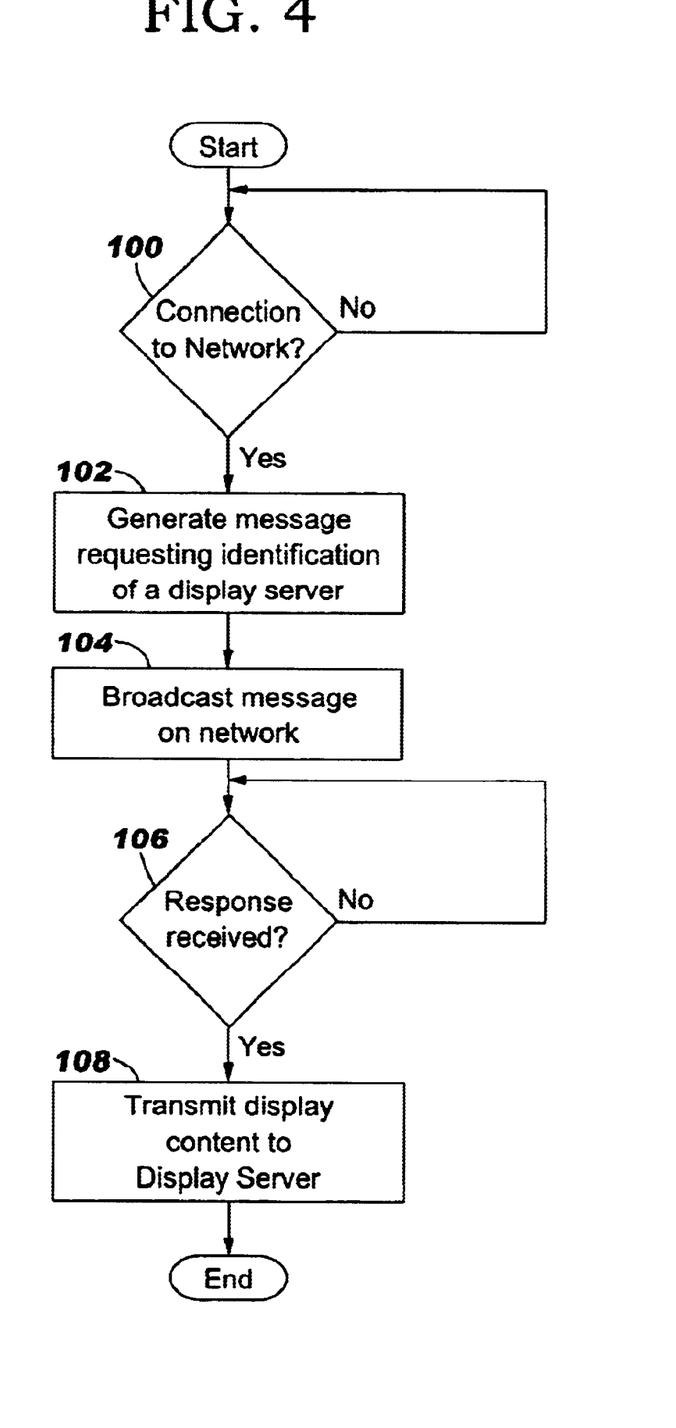
FIG. 4 is a flowchart illustrating operations of a data processing system according to one embodiment of the present to discover and utilize an alternative display device.

The operations of a data processing system according to one embodiment of the present invention will now be described with reference to FIG. 4. As is seen in FIG. 2, a pervasive computing device, such as the data processing systems 20, 22 illustrated in FIG. 1, waits for connection to a network, such as network 30 (block 100). After detecting connection to the network 30, the pervasive computing device generates a service discovery request message which requests discovery of the display server 26 and which may include at least an address identifying the pervasive computing device (block 102).

The specific message generated may depend on the protocols utilized, however, it is preferred that the message be an Internet Protocol (IP) datagram. As will be appreciated by those of skill in the art, the particular device address included in the service discovery request message may depend on the type of connection and/or the type of device utilized. Thus, the address may be an IP address, an Ethernet address, a subscriber identification or other such address which allows for communication with the pervasive computing device. The service discovery request message may also include further information about the session or the pervasive computing device. For example, the message may include information such as the type of device, a user identification such as user logon, user account information, user preferences, user passwords or other information which may be useful in displaying information on the alternative display such as display 34 associated with the display server 26 or in providing secure access to the display server 26. Furthermore, device information may be included in the service discovery request message.

After generating the service discovery request message, the pervasive computing device, such as the data processing systems 20, 22, broadcasts the message onto the network to which the device is connected (block 104). As used herein, the term broadcast is used to describe the transmission of the same message to a plurality of devices connected to a network. Such a message may be broadcast to every device connected to the network or to devices connected to the network which have network addresses within a predefined range of addresses. Thus, the term broadcast is intended to refer to both broadcast and multicast messages. The message is broadcast because the pervasive computing device may not know in advance the address or location of the server on the network which provides the information about the accessibility of the display server 26. If a networked device receives the message and cannot respond to the message, then the message is ignored by that device. However, when the message is received by the server which is capable of identifying the display server 26 to the pervasive computing device, then the operations of FIG. 5 may be performed to respond to the message.

After broadcasting the service discovery request message, the pervasive computing device waits for a response (block 106). When the response is received by the pervasive computing device, the display content is then provided to the display server 26 for rendering (block 108). The display content may be provided in many manners, however, it is preferred that the display content be provide as an HTTP POST or WSP POST message to post a web page to the display server 26. Thus, it is preferred that the web server be capable of supporting HTTP POST or WSP POST. After discovering the display server 26, the posting of information to the display server 26 may be carried out without further service discovery requests while the device remains connected to the network 30.

As briefly described above, the response to the service discovery request message may be provided by the display server 26 or by another server with knowledge of the display server 26. Furthermore, the response may be a specific address of the display server 26, such as a URL to which the content for display is POSTed, or may be a pointer, such as a URL, to a server which may provide accessibility information about a display server. In the latter case, the pervasive computing device may request that display server information be provided from the location specified by the pointer to discover the location or address of the display server 26 (e.g. request the specified URL by issuing a Hyper-Text Transfer Protocol (HTTP), Gopher, File Transfer Protocol (FTP), Wireless Session Protocol (WSP) or other protocol request) prior to sending display content to the display server 26.

Figure 5:
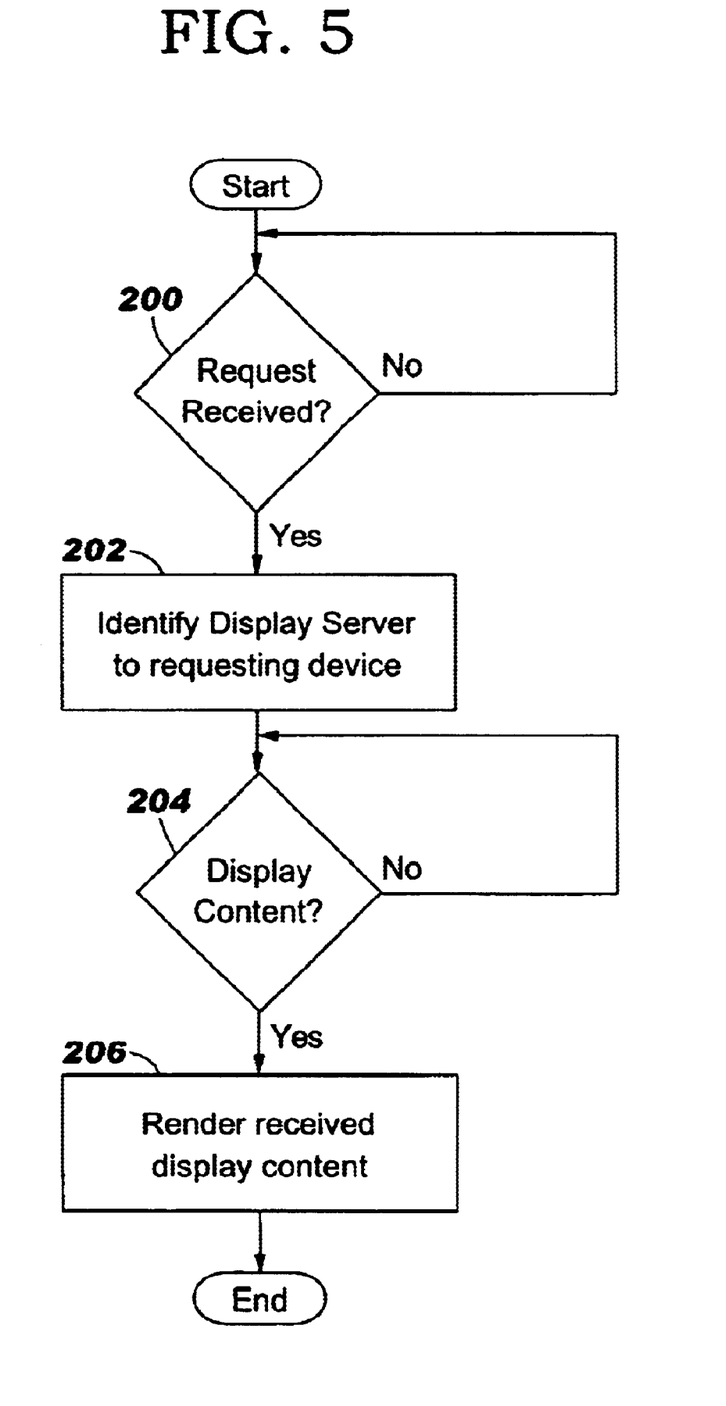
FIG. 5 is a flowchart illustrating operations of a display server according to one embodiment of the present invention.

FIG. 5 illustrates the operations of a display server 26, according to one embodiment of the present invention. As seen in FIG. 5, the display server 26 waits for receipt of a service discovery request message from a pervasive computing device such as the data processing systems 20, 22 (block 200). After receiving the service discovery request message the display server 26 parses the message to obtain the information contained in the message such as a source address, the user identification, device information or the like and uses this information to identify the display server 26 to the requesting data processing system 20, 22 (block 202). The display server 26 then waits for display content from the requesting data processing system 20, 22 (block 204) and then renders this display content on the alternative display, such as display 34, when received (block 206). As described above, the display content may be provided as an HTTP or WSP POST message and the page posted to the display server 26 in the HTTP or WSP POST message is then rendered by the display server 26 to provide the display content on the alternative display, such as display 34, to a user. Furthermore, as described above, the receipt of display content and the rendering of display content may be repeated without the device needing to re-issue a new service discovery request. This process may continue until the data processing system's connection to the network 30 is ended or the connection to the display server 26 is otherwise terminated.

As is seen from the above discussion, a pervasive computing device need not know the address or location of a display server 26 in order to utilize the alternative display, such as display 34 of the display server 26, because the pervasive computing device can broadcast a message and know that, if a display server 26 is accessible to the network to which the device is attached, then it will be identified in response to the request. Thus, pervasive computing devices may connect to different networks in different manners without knowing in advance the configuration of the network or the location of a display server 26 which will provide the alternative display. Furthermore, the alternative display, such as display 34, may be provided automatically upon detection of connection to the network so as to relieve the user of any intervention to set up the alternative display. Also, because a display server is utilized, the pervasive computing device need not be specifically configured to drive the alternative display. Thus, the pervasive computing device may provide logical display content such as in the form of a markup language page which may be rendered by the display server on many different types of displays.

While the present invention has been described with respect to the broadcast of messages to discover the display server 26, as will be appreciated by those of skill in the art, this discovery process may be carried out utilizing other protocols, such as, for example, the UPnP protocol or the Jini protocol. Thus, the present invention should not be construed as limited to any particular mechanism for discovering the presence of the display server 26 but may be utilized with any protocol capable of identifying the display server 26 to the data processing system 20, 22.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of accessing an alternative display from a data processing system, the method comprising the steps of:
   automatically discovering the accessibility of a display server operably associated with a network upon connection of the data processing system with the network;
   generating display information corresponding to display content of an application program executing at the data processing system to be rendered by a display of the data processing system; and
   providing to the display server over the network, the generated display information so as to allow the corresponding display content to be rendered by the display server on a display associated with the display server.

2. A method of accessing an alternative display from a data processing system, the method comprising the steps of:
   automatically discovering the accessibility of a display server operably associated with a network upon connection of the data processing system with the network;
   generating, at the data processing system, display information corresponding to display content to be rendered by a display of the data processing system;
   providing to the display server over the network, the generated display information so as to allow the corresponding display content to be rendered by the display server on a display associated with the display server; and
   wherein the step of automatically discovering the accessibility of a display server comprises the steps of:
      detecting connection of the data processing system with the network;
      broadcasting a service discovery request on the network responsive to detecting connection of the data processing system with the network;
      receiving a response to the broadcast service discovery request; and
      evaluating the received response so as to discover the accessibility of the display server.

3. A method according to claim 1, wherein the step of generating comprises the step of receiving at the data processing system information to be displayed on the display of the data processing system.

4. A method according to claim 3, wherein the step of providing comprises the step of forwarding the received information to the display server.

5. A method according to claim 1, wherein the step of providing comprises the step of posting the generated display information to the display server so as to render the corresponding display content on the display associated with the display server.

6. A method according to claim 1, wherein the generated display information comprises a markup language page.

7. A method according to claim 6, wherein the markup language comprises at least one of Hypertext Markup Language (HTML), Wireless Markup Language (WML), Voice Extensible Markup Language (VoiceXML) and Extensible Markup Language (XML).

8. A method according to claim 5, wherein the step of posting the generated display information comprises the step of transmitting at least one of an HTTP POST message and a Wireless Session Protocol (WSP) POST message to the display server.

9. A method according to claim 1, wherein the data processing system comprises a pervasive computing device.

10. A method according to claim 1, wherein the network comprises a network incorporated into a mobile vehicle.

11. A method according to claim 1, wherein the display content to be rendered by a display of the data processing system and the corresponding display content to be rendered by the display server on a display associated with the display server represent the same information content.

12. A system for accessing an alternative display from a data processing system, comprising:
   means for automatically discovering the accessibility of a display server operably associated with a network upon connection of the data processing system with the network;
   means for generating display information of an application program executing at the data processing system corresponding to display content to be rendered by a display of the data processing system; and
   means for providing to the display server over the network, the generated display information so as to allow the corresponding display content to be rendered by the display server on a display associated with the display server.

13. A system for accessing an alternative display from a data processing system, comprising:
  means for automatically discovering the accessibility of a display server operably associated with a network upon connection of the data processing system with the network;
  means for generating display information corresponding to display content to be rendered by a display of the data processing system;
  means for providing to the display server over the network, the generated display information so as to allow the corresponding display content to be rendered by the display server on a display associated with the display server; and
  wherein the means for automatically discovering the accessibility of a display server comprises:
    means for detecting connection of the data processing system with the network;
    means for broadcasting a service discovery request on the network responsive to detecting connection of the data processing system with the network;
    means for receiving a response to the broadcast service discovery request; and
    means for evaluating the received response so as to discover the accessibility of the display server.

14. A system according to claim 12, wherein the means for generating comprises means for receiving at the data processing system information to be displayed on the display of the data processing system.

15. A system according to claim 14, wherein the means for providing comprises means for forwarding the received information to the display server.

16. A system according to claim 12, wherein the means for providing comprises means for posting the generated display information to the display server so as to render the corresponding display content on the display associated with the display server.

17. A system according to claim 12, wherein the generated display information comprises a markup language page.

18. A system according to claim 17, wherein the markup language comprises at least one of Hypertext Markup Language (HTML), Wireless Markup Language (WML), Voice Extensible Markup Language (VoiceXML) and Extensible Markup Language (XML).

19. A system according to claim 16, wherein the means for posting the generated display information comprises means for transmitting at least one of an HTTP POST message and a Wireless Session Protocol (WSP) POST message to the display server.

20. A system according to claim 12, wherein the data processing system comprises a pervasive computing device.

21. A system according to claim 12, wherein the network comprises a network incorporated into a mobile vehicle.

22. A system according to claim 12, wherein the display content to be rendered by a display of the data processing system and the corresponding display content to be rendered by the display server on a display associated with the display server represent the same information content.

23. A computer program product for accessing an alternative display from a data processing system, comprising:
  a computer-readable storage medium having computer readable program code means embodied in said medium, said computer-readable program code means comprising:
    computer-readable program code means for automatically discovering the accessibility of a display server operably associated with a network upon connection of the data processing system with the network;
    computer-readable program code means for generating display information corresponding to display content of an application program executing at the data processing system to be rendered by a display of the data processing system; and
    computer-readable program code means for providing to the display server over the network, the generated display information so as to allow the corresponding display content to be rendered by the display server on a display associated with the display server.

24. A computer program product for accessing an alternative display from a data processing system, comprising:
  a computer-readable storage medium having computer readable program code means embodied in said medium, said computer-readable program code means comprising:
    computer-readable program code means for automatically discovering the accessibility of a display server operably associated with a network upon connection of the data processing system with the network;
    computer-readable program code means for generating display information corresponding to display content to be rendered by a display of the data processing system;
    computer-readable program code means for providing to the display server over the network, the generated display information so as to allow the corresponding display content to be rendered by the display server on a display associated with the display server; and
    wherein the computer-readable program code means for automatically discovering the accessibility of a display server comprises:
      computer-readable program code means for detecting connection of the data processing system with the network;
      computer-readable program code means for broadcasting a service discovery request on the network responsive to detecting connection of the data processing system with the network;
      computer-readable program code means for receiving a response to the broadcast service discovery request; and
      computer-readable program code means for evaluating the received response so as to discover the accessibility of the display server.

25. A computer program product according to claim 23, wherein the computer-readable program code means for generating comprises computer-readable program code means for receiving at the data processing system information to be displayed on the display of the data processing system.

26. A computer program product according to claim 25, wherein the computer-readable program code means for providing comprises computer-readable program code means for forwarding the received information to the display server.

27. A computer program product according to claim 23, wherein the computer-readable program code means for providing comprises computer-readable program code means for posting the generated display information to the display server so as to render the corresponding display content on the display associated with the display server.

28. A computer program product according to claim 23, wherein the generated display information comprises a markup language page.

29. A computer program product according to claim 28, wherein the markup language comprises at least one of Hypertext Markup Language (HTML), Wireless Markup Language (WML), Voice Extensible Markup Language (VoiceXML) and Extensible Markup Language (XML).

30. A computer program product according to claim 27, wherein the computer-readable program code means for posting the generated display information comprises computer-readable program code means for transmitting at least one of an HTTP POST message and a Wireless Session Protocol (WSP) POST message to the display server.

31. A computer program product according to claim 23, wherein the data processing system comprises a pervasive computing device.

32. A computer program product according to claim 23, wherein the network comprises a network incorporated into a mobile vehicle.

33. A computer program product according to claim 23, wherein the display content to be rendered by a display of the data processing system and the corresponding display content to be rendered by the display server on a display associated with the display server represent the same information content.

* * * * *